US011240858B2

(12) United States Patent
Dion et al.

(10) Patent No.: US 11,240,858 B2
(45) Date of Patent: Feb. 1, 2022

(54) TRAFFIC STEERING FOR STATELESS PACKETS OVER MULTIPATH NETWORKS

(71) Applicant: Nokia Solutions and Networks Oy, Espoo (FI)

(72) Inventors: Gino Dion, Quispamsis (CA); Steven Morin, Chapel Hill, NC (US); Randall Sharpe, Ottawa (CA)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/965,391

(22) Filed: Apr. 27, 2018

(65) Prior Publication Data
US 2019/0335520 A1  Oct. 31, 2019

(51) Int. Cl.
*H04W 76/15* (2018.01)
*H04W 76/12* (2018.01)
*H04L 29/06* (2006.01)
*H04L 12/707* (2013.01)
*H04L 29/08* (2006.01)

(52) U.S. Cl.
CPC ............ *H04W 76/15* (2018.02); *H04L 45/24* (2013.01); *H04L 69/10* (2013.01); *H04L 69/165* (2013.01); *H04W 76/12* (2018.02); *H04L 67/142* (2013.01); *H04L 2212/00* (2013.01)

(58) Field of Classification Search
CPC ...... H04W 76/15; H04W 76/12; H04L 45/24; H04L 69/10; H04L 69/165; H04L 2212/00; H04L 67/142
See application file for complete search history.

(56) References Cited

U.S. PATENT DOCUMENTS 9,166,955 B2 * 10/2015 Bollay ................. H04L 63/166
9,722,932 B1 *  8/2017 Brandwine ......... H04L 47/2441
9,736,028 B2 *  8/2017 Ansari .................. G06Q 30/04
(Continued)

OTHER PUBLICATIONS

Khalili et al., "Opportunistic Linked-Increases Congestion Control Algorithm for MPTCP", Internet-Draft, IETF, Jul. 4, 2014, 11 pages.
(Continued)

*Primary Examiner* — Dady Chery
(74) *Attorney, Agent, or Firm* — Tong, Rea, Bentley & Kim, LLC

(57) ABSTRACT

A tunnel is established between a gateway and a customer premises equipment (CPE) that are connected by a plurality of concurrent communication paths. In some cases, some the communication paths operate according to different access technologies. The tunnel is associated with a hypertext transfer protocol (HTTP) session. The packet is encapsulated based on the HTTP session and the encapsulated packet is transmitted over the plurality of concurrent communication paths via the tunnel. Information representing the encapsulated packet is received via the tunnel between the gateway and the CPE. The encapsulated packet is de-encapsulated and a packet of a stateless flow is generated based on a payload of the de-encapsulated packet. In some cases, the stateless flow is a user datagram protocol (UDP) flow and the encapsulated packet is conveyed using a plurality of transmission control protocol (TCP) sessions associated with the plurality of concurrent communication paths.

28 Claims, 6 Drawing Sheets

(56) References Cited

U.S. PATENT DOCUMENTS

| | | | | |
|---|---|---|---|---|
| 2003/0093563 A1* | 5/2003 | Young | ................ | H04L 12/4633 709/245 |
| 2007/0019545 A1* | 1/2007 | Alt | ................ | H04L 12/4633 370/230 |
| 2008/0049638 A1* | 2/2008 | Ray | ................ | H04L 41/0896 370/252 |
| 2011/0090815 A1* | 4/2011 | Gundavelli | ................ | H04L 12/4633 370/253 |
| 2013/0036192 A1* | 2/2013 | Fausak | ................ | H04L 67/42 709/217 |
| 2015/0092551 A1* | 4/2015 | Moisand | ................ | H04L 12/4633 370/235 |
| 2015/0295728 A1* | 10/2015 | Kadel | ................ | H04L 12/2863 370/235 |
| 2015/0381756 A1* | 12/2015 | Lotfallah | ................ | H04L 67/2814 726/4 |
| 2016/0380884 A1* | 12/2016 | Sarikaya | ................ | H04W 8/08 370/389 |
| 2017/0118081 A1* | 4/2017 | Rius I Riu | ................ | H04L 41/08 |
| 2017/0192806 A1* | 7/2017 | Koat | ................ | H04L 12/66 |

OTHER PUBLICATIONS

Boucadair et al., "An MPTCP Option for Network-Assisted MPTCP Deployments: Plain Transport Mode", Internet-Draft, IETF, Jul. 4, 2016, 34 pages.

Fabregas et al, "TR-348: Hybrid Access Broadband Network Architecture", Broadband Forum Technical Report, Issue 1, Jul. 2016, 49 pages.

U.S. Appl. No. 15/705,379, filed Sep. 18, 2018, listing Gino Dino et al. as inventors, entitled "HCPE-Based Intelligent Path Selection Over a Multipath Network".

\* cited by examiner

US 11,240,858 B2

TRAFFIC STEERING FOR STATELESS PACKETS OVER MULTIPATH NETWORKS

BACKGROUND

Many technologies are available to provide network connectivity to user equipment (UE) or customer premises equipment (CPE). Wireline connectivity is provided using digital subscriber line (DSL) connectivity, cable modems that implement data over cable service interface specification (DOCSIS), and the like. Wireless connectivity is provided using standards defined by the Third Generation Partnership Project (3GPP) such as Long Term Evolution (LTE) to support communication in licensed or unlicensed frequency bands, standards defined by the IEEE to support communication in unlicensed frequency bands such as Wi-Fi in a wireless local area network (WLAN), satellite links, and the like. A single CPE can therefore access the network using combinations of paths that implement different access technologies including wireline or wireless technologies, such as a combination of a path that operates according to DSL and a path that operates according to LTE, a satellite path and an LTE path, an LTE path and a Wi-Fi path, a DOCSIS path and an LTE path, and the like. The paths have different capabilities and characteristics such as different latencies, capacities, costs, and the like.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
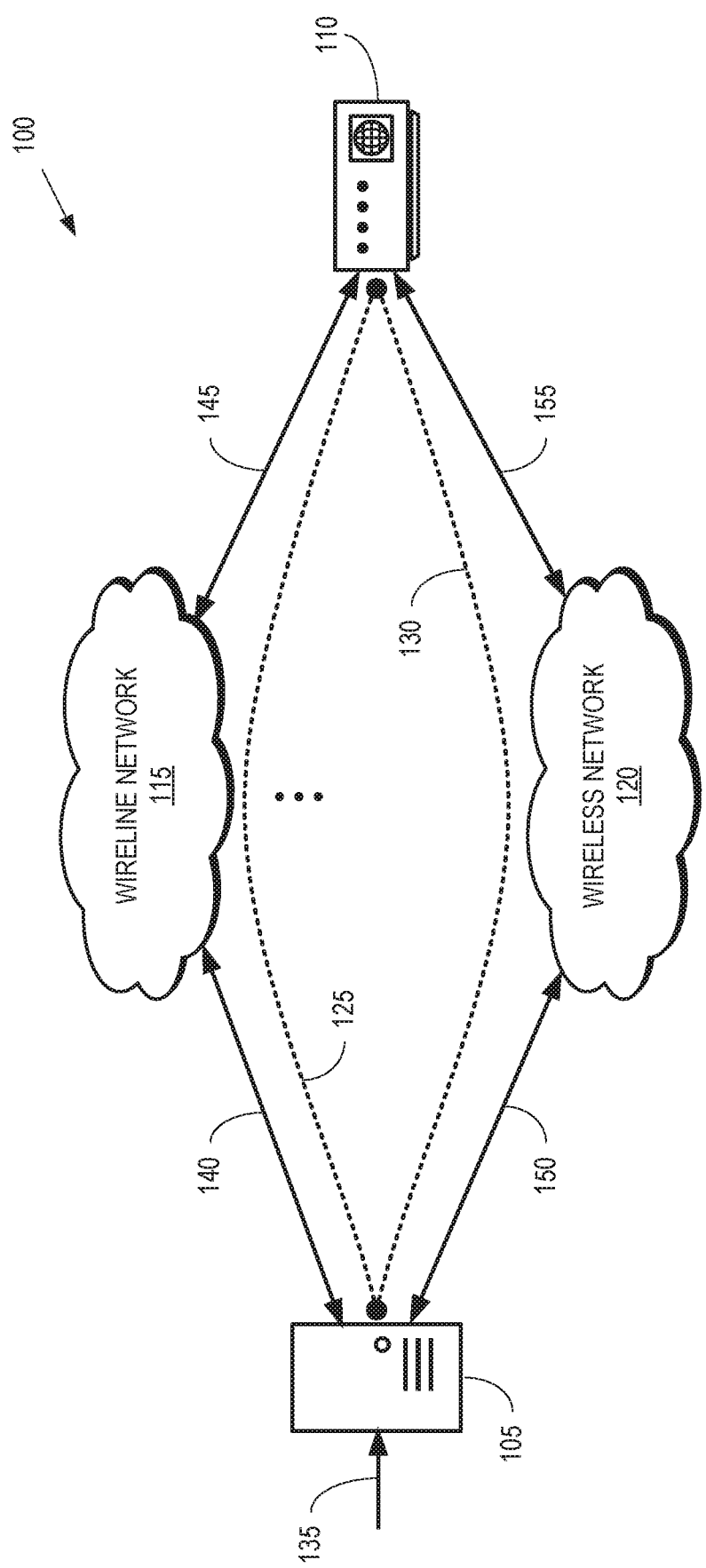
FIG. 1 is a diagram of a communication system employing encapsulation of stateless packets according to some embodiments.

A transmission control protocol (TCP) is a transport layer protocol that is used to convey packets using a session that is negotiated between two endpoints. The sessions are negotiated using a handshake protocol to define a state of the session prior to transporting the packets, i.e., TCP is a stateful protocol. Multiple TCP sessions can be established between the same endpoints using a multipath transmission control protocol (MPTCP). For example, traffic is aggregated across multiple paths between a hybrid access CPE and a hybrid access gateway using corresponding sessions established according to MPTCP. The MPTCP paths are also available to provide resiliency by supporting primary and backup communication paths or to perform traffic offload management. However, MPTCP cannot be used to aggregate traffic that is transmitted according to a stateless protocol such as a user datagram protocol (UDP) because data units in a stateless protocol are individually addressed and routed based on information carried in each unit instead of state information for a session. Stateless protocols such as UDP are used in many important applications including peer-to-peer (P2P) traffic distribution, point-to-point video sharing, video conferencing services, domain name server (DNS) queries, online multiplayer games, IPTV, multicast adaptive bit rate video, and the like. However, applications that use stateless packets are not able to take advantage of the benefits of multipath transmission such as load sharing, load-balancing, resiliency, and the like.

FIGS. 1-8 disclose systems and techniques for conveying packets in stateless flows (such as UDP flows) through a multipath environment using a hypertext transfer protocol (HTTP) session (or HTTP Secure, HTTPS, session) to establish a tunnel for conveying the stateless packets between a gateway and a customer premises equipment (CPE). In some embodiments, the HTTP session is negotiated according to MPTCP and the HTTP session is able to support one or more flows to convey traffic over one or more paths between the gateway and the CPE. For example, the HTTP session can be associated with multiple P2P flows so that stateless packets in the P2P flows can be conveyed over aggregated paths that operate according to technologies such as LTE, Wi-Fi, a satellite link, DSL, DOCSIS, and the like. Stateless packets are encapsulated within an HTTP header that is formed based on state information for the corresponding HTTP session. The encapsulated packets are conveyed over one or more paths according to MPTCP, de-encapsulated at the receiving entity, and then the stateless packets are forwarded towards their destination in an external network. For example, a software CPE agent implemented at the CPE can initiate and create an HTTP session that is terminated by a proxy server implemented in a gateway that operates according to MPTCP. The CPE agent is configured to intercept upstream UDP traffic and encapsulate the UDP packets in the HTTP session for multipath transmission between the CPE and the proxy server in the gateway. The proxy server de-encapsulates the UDP packets for forwarding to an external network. For another example, the proxy server in the gateway is configured to intercept downstream UDP traffic and encapsulate the UDP packets in the HTTP session for multipath transmission to the CPE, which de-encapsulates the UDP packets for use by the CPE.

FIG. 1 is a diagram of a communication system 100 according to some embodiments. The communication system 100 includes a hybrid access gateway 105 that is implemented in a service provider network. The hybrid access gateway 105 provides support for MPTCP for traffic steering over multiple TCP connections in the communication system 100. The multiple TCP connections operate according to multiple different access technologies. The communication system 100 also includes customer premises equipment (CPE) 110 such as a hybrid residential gateway that is configured to support connections according to the multiple access technologies supported by the hybrid access gateway 105.

The communication system 100 supports one or more wireline networks 115 and one or more wireless networks 120. A single wireline network 115 and a single wireless network 120 are shown in FIG. 1 in the interest of clarity. However, some embodiments of the communication system 100 include more than one wireline network 115 or more than one wireless network 120. The wireline network 115 operates according to an access technology, such as digital subscriber line (DSL) connectivity, data over cable service interface specification (DOCSIS), and the like. The wireless network 120 operates according to one or more other access technologies defined by standards such as Long Term Evolution (LTE) standards defined by the Third Generation Partnership Project (3GPP) to support communication in licensed or unlicensed frequency bands, Wi-Fi standards defined by the IEEE to support communication in unlicensed frequency bands in a wireless local area network (WLAN), satellite links, and the like. As used herein, the term "access technology" refers to a set of standards and corresponding physical devices or connections that are used to support communication between entities in the communication system 100. One access technology is different than another access technology if the two access technologies do not require each other to support communication. For example, the access technologies used for the wireline network 115 are different than the access technologies used for the wireless network 120. For another example, the DSL access technology is different than the DOCSIS access technology and the LTE access technology is different than the Wi-Fi access technology.

The hybrid access gateway 105 and the CPE 110 are able to form a MPTCP connection that includes multiple TCP connections, or subflows, that are used to carry information over the wireline network 115, the wireless network 120, and other networks that are available to provide connections between the hybrid access gateway 105 and the CPE 110. In the illustrated embodiment, the MPTCP connection includes a first subflow 125 that conveys packets via the wireline network 115 using a first TCP session and a second subflow 130 that conveys packets via the wireless network 120 using a second TCP session. Since the TCP is a stateful protocol, the TCP sessions for the subflows 125, 130 are negotiated by the hybrid access gateway 105 and the CPE 110 using a handshake protocol to define a state of the session prior to transporting the packets. The hybrid access gateway 105 and the CPE 110 are able to perform traffic steering of uplink and downlink packets that are conveyed over one or more of the subflows 125, 130. For example, the hybrid access gateway 105 is able to aggregate the subflows 125, 130 into a single flow to increase bandwidth for downlink packets, designate the subflow 130 as a backup to provide resiliency in case of a failure of the subflow 125, or offload traffic from the subflow 125 to the subflow 130 for load-balancing purposes. The CPE 110 is able to perform similar traffic steering of uplink traffic. Although the subflows 125, 130 that form the MPTCP connection shown in FIG. 1 operate according to different access technologies, some embodiments of the MPTCP connection include different subflows that operate according to the same access technology, as well as potentially including other subflows that operate according to different technologies.

As discussed herein, stateless packets, such as UDP packets in a stateless flow 135, are not able to take advantage of the benefits provided by the MPTCP connection. A tunnel is therefore established between the hybrid access gateway 105 and the CPE 110 using the communication paths 140, 145 through the wireline network 115 and the communication paths 150, 155 through the wireless network 120. The tunnel is associated with a hypertext transfer protocol (HTTP) session. Stateless packets are encapsulated based on the HTTP session and the encapsulated packets are transmitted using one or more of the subflows 125, 130 of the MPTCP connection via the tunnel. For example, information representing the stateless packet is added to a payload and a header for the payload is generated based on the HTTP session. The encapsulated packet is de-encapsulated at the receiving end (e.g., the hybrid access gateway 105 for uplink packets and the CPE 110 for downlink packets) and a copy of the original stateless packet is generated based on a payload of the de-encapsulated packet. The original stateless packet can then be forwarded to another destination such as a network connected to the hybrid access gateway 105 or an application supported by the CPE 110. The stateless packets are therefore able to make use of the benefits provided by the MPTCP connection such as traffic steering, resiliency, load-balancing, and the like.

Some embodiments of the CPE 110 initiate the HTTP session towards an HTTP proxy implemented in the hybrid access gateway 105 in response to provisioning of the CPE 110, e.g., according to a standard based protocol, using an auto configuration server, or other means of device management. The CPE 110 implements a software agent that tracks and intercepts stateless communication flows, such as UDP-based flows, and encapsulates the stateless packet in the HTTP session. For example, the CPE 110 can perform encapsulation based on a traffic type, a steering policy, or other criteria. The CPE 110 then forwards the encapsulated packet (e.g., as a forwarded byte stream) to an HTTP proxy implemented in the hybrid access gateway 105. Some embodiments of the hybrid access gateway 105 implemented similar functionality to identify, encapsulate, and forward packets in the stateless flows towards the CPE 110.

Encapsulating stateless packets in an HTTP session for transmission over the subflows 125, 130 according to MPTCP allows the hybrid access gateway 105 or the CPE 110 to implement complex traffic engineering rules. For example, the hybrid access gateway 105 is able to regulate peer-to-peer (P2P) traffic using different subflows 125, 130 for each P2P flow that is terminated at the CPE 110. In contrast, other techniques that convert UDP flows directly into TCP flows require a separate MPTCP connection for each P2P flow, which results in dozens or hundreds of MPTCP connections in some applications. Furthermore, large stateless packets can be transmitted in multiple HTTP packets, and aggregated upon reception, which allows UDP packets that are larger than a maximum transmittable unit (MTU) for a TCP connection. Low latency UDP traffic and also be directed onto the best network path (and corresponding subflow 125, 130) according to advanced congestion control techniques. Application-aware traffic steering decisions can also be performed in real-time for the encapsulated stateless packets. Some embodiments of the hybrid access gateway 105 and the CPE 110 use the multiple subflows 125, 130 to support multicast adaptive bit rates for high-bandwidth applications such as live video content broadcast.

Figure 2:
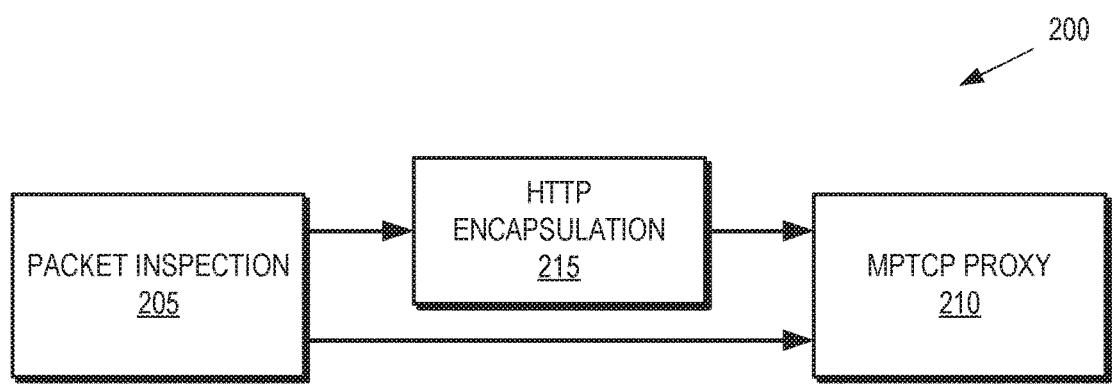
FIG. 2 is a block diagram of a transmitter that is configured to perform encapsulation of stateless packets according to some embodiments.

FIG. 2 is a block diagram of a transmitter 200 that is configured to perform encapsulation of stateless packets according to some embodiments. The transmitter 200 is implemented in some embodiments of the hybrid access gateway 105 shown in FIG. 1 for transmitting downlink packets and the CPE 110 shown in FIG. 1 for transmitting uplink packets. The transmitter 200 receives packets that are to be transmitted or forwarded over one or more subflows of an MPTCP connection such as the subflows 125, 130 shown in FIG. 1. For example, if the transmitter 200 is implemented in a gateway, the transmitter 200 can receive packets from a network entity such as peers in a P2P connection. For another example, if the transmitter 200 is implemented in a CPE, the transmitter 200 can receive packets from an application implemented in or associated with the CPE.

The transmitter 200 includes a packet inspection module 205 that inspects the received packets to determine whether the packets are part of a stateless flow. For example, the packet inspection module 205 can perform deep packet inspection to identify UDP packets. The packet inspection module 205 routes the received packet to an MPTCP proxy 210 in response to determining that the received packet is not part of a stateless flow and can therefore be transmitted according to MPTCP. The packet inspection module 205 routes the received packet to an HTTP encapsulation module 215 in response to determining that the received packet is a stateless packet of a stateless flow. For example, the packet inspection module 205 routes UDP packets to the HTTP encapsulation module 215.

The HTTP encapsulation module 215 encapsulates the stateless packet based on an HTTP session established between the entity that implements the transmitter and a receiving entity. Encapsulating the stateless packet includes generating a payload including information that represents the stateless packet and appending a header that is generated based on the HTTP session. The encapsulated packet is then provided to the MPTCP proxy 210, which is configured to transmit the encapsulated packet over one or more of the subflows according to MPTCP. Some embodiments of the MPTCP proxy 210 generate a byte stream that represents the encapsulated packet. The byte stream includes an extensible markup language (XML) header that is generated based on the HTTP session, one or more bytes including information representative of the encapsulated packet, and an XML terminator to indicate the end of the bytes that represent the encapsulated packet. The byte stream is forwarded by the MPTCP proxy 210.

Figure 3:
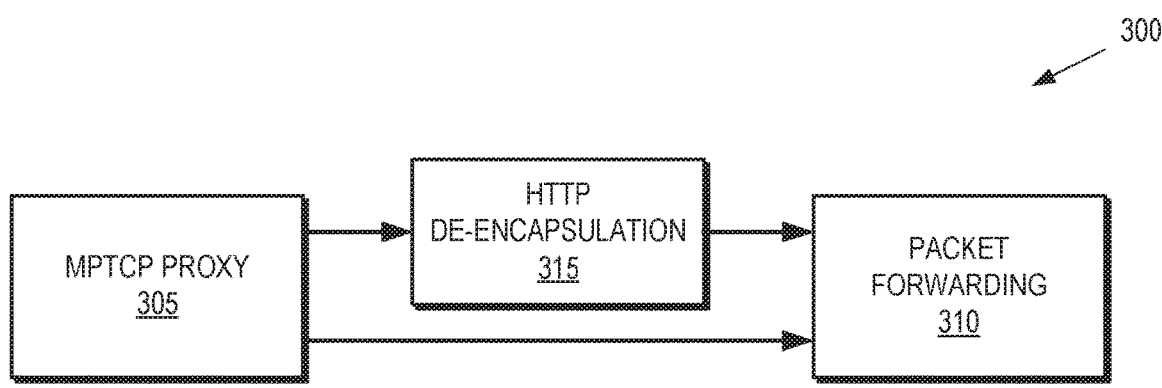
FIG. 3 is a block diagram of a receiver that is configured to de-encapsulate packets that include information representative of stateless packets according to some embodiments.

FIG. 3 is a block diagram of a receiver 300 that is configured to de-encapsulate packets that include information representative of stateless packets according to some embodiments. The receiver 300 is implemented in some embodiments of the hybrid access gateway 105 shown in FIG. 1 for receiving uplink packets and the CPE 110 shown in FIG. 1 for receiving downlink packets. The receiver 300 receives packets that have been transmitted or forwarded over one or more subflows of an MPTCP connection such as the subflows 125, 130 shown in FIG. 1. For example, if the receiver 300 is implemented in a gateway, the receiver 300 can receive packets from a CPE over the subflows of the MPTCP connection. For another example, if the receiver 300 is implemented in a CPE, the receiver 300 can receive packets from a hybrid access gateway over the subflows of the MPTCP connection.

The receiver 300 includes an MPTCP proxy 305 that receives the packets via the subflows of the MPTCP connection. The MPTCP proxy 305 is configured to determine whether the received packets are HTTP encapsulated packets. If not, the MPTCP proxy 305 transmits the received packet to a packet forwarding module 310, which is configured to transmit or forward the received packet. For example, if the receiver 300 is implemented in a hybrid access gateway, the packet forwarding module 310 is able to forward the received packet to a network entity. For another example, if the receiver 300 is implemented in a CPE, the packet forwarding module 310 is able to forward the received packet to an application implemented by or associated with the CPE. If the MPTCP proxy 305 determines that a received packet is an HTTP encapsulated packet, the MPTCP proxy 305 transmits the received packet to an HTTP de-encapsulation module 315.

The HTTP de-encapsulation module 315 receives HTTP encapsulated packets and reconstructs stateless packets based on the information included in the payloads of the HTTP encapsulated packets. The HTTP de-encapsulation module 315 is therefore able to remove a header from the HTTP encapsulated packet and extract the information in the payload of the HTTP encapsulated packet. In some cases, the information that represents the stateless packet is conveyed in multiple HTTP encapsulated packets. The HTTP de-encapsulation module 315 is therefore able to perform re-assembly of the stateless packet based on information included in the payloads of multiple HTTP encapsulated packets. The HTTP de-encapsulation module 315 transmits the extracted (and potentially re-assembled) stateless packet to the packet forwarding module 310.

Figures 4, 5:
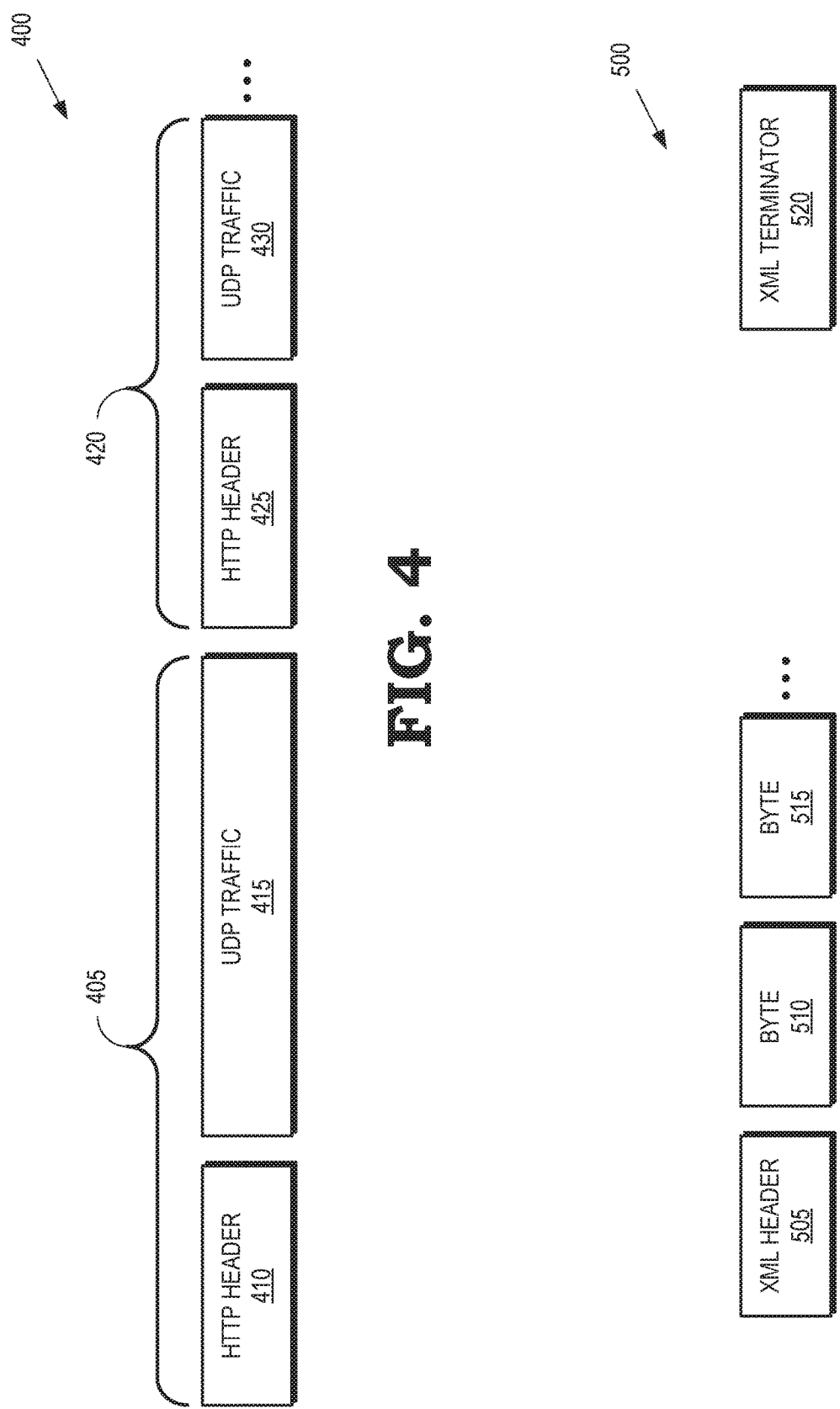
FIG. 4 is a block diagram of a sequence of encapsulated packets according to some embodiments.
FIG. 5 is a block diagram of a byte stream that represents an encapsulated packet according to some embodiments.

FIG. 4 is a block diagram of a sequence 400 of encapsulated packets according to some embodiments. The encapsulated packets are generated by some embodiments of the hybrid access gateway 105 shown in FIG. 1, the CPE 110 shown in FIG. 1, and the transmitter 200 shown in FIG. 2. The encapsulated packet 405 includes an HTTP header 410 that is generated based upon an HTTP session that is used to convey the encapsulated packet 405 in a multipath environment, as discussed herein. The encapsulated packet 405 also includes a payload 415 that includes information that represents at least a portion of a stateless packet such as a UDP packet. The encapsulated packet 420 includes an HTTP header 425 that is generated based upon an HTTP session that is used to convey the encapsulated packet 420 in a multipath environment, as discussed herein. The encapsulated packet 420 also includes a payload 430 that includes information that represents at least a portion of a stateless packet such as a UDP packet. In some embodiments, the size of the payload 415 is different than the size of the payload 430. Information in the payloads 415, 430 can be combined (or re-assembled) to reconstruct a stateless packet that is too large to include in a single payload.

FIG. 5 is a block diagram of a byte stream 500 that represents an encapsulated packet according to some embodiments. The byte stream 500 is generated by some embodiments of the hybrid access gateway 105 shown in FIG. 1, the CPE 110 shown in FIG. 1, and the transmitter 200 shown in FIG. 2. The byte stream 500 represents some embodiments of the encapsulated packet 405 or the encapsulated packet 420 shown in FIG. 4. The byte stream 500 includes an XML header 505 that is generated based on the HTTP session or HTTP header of the encapsulated packet, one or more bytes 510, 515, and an XML terminator 520 that indicates the end of the byte stream 500 that represents an encapsulated packet.

Figure 6:
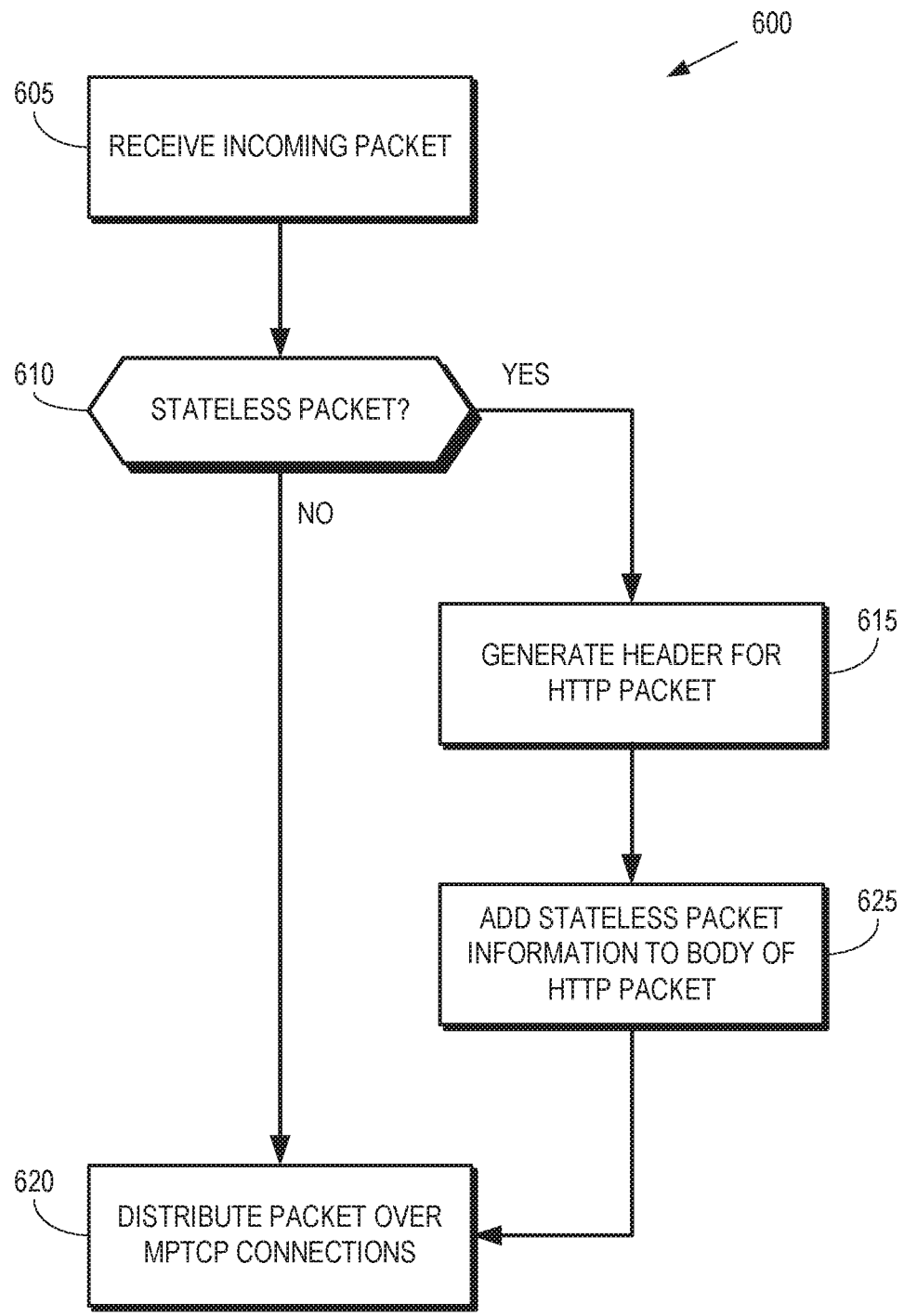
FIG. 6 is a flow diagram of a method of selectively encapsulating stateless packets for transmission in a multipath environment according to some embodiments.

FIG. 6 is a flow diagram of a method 600 of selectively encapsulating stateless packets for transmission in a multipath environment according to some embodiments. The method 600 is implemented in some embodiments of the hybrid access gateway 105 shown in FIG. 1, the CPE 110 shown in FIG. 1, and the transmitter 200 shown in FIG. 2. In the illustrated embodiment, a gateway and a CPE are able to communicate over multiple networks such as wireline networks or wireless networks using an MPTCP session that supports multiple TCP subflows.

At block 605, an incoming packet is received. The packet is received from an entity in an external network (e.g., if the transmitter is implemented in a gateway) or an application (e.g., if the transmitter is implemented in a CPE).

At decision block 610, the transmitter determines whether the incoming packet is a stateless packet. For example, deep packet inspection can be performed on the incoming packet to identify stateless packets such as UDP packets. If the packet is a stateless packet, the method 600 flows to block 615. If the packet is not a stateless packet, the method 600 flows to block 620.

At block 615, a header is generated for an HTTP packet based on an HTTP session between the gateway and the CPE. For example, an HTTP the encapsulation module can generate an HTTP header. At block 625, information representing the stateless packet is added to the body of an HTTP packet and the header is appended to the HTTP packet. In the illustrated embodiment, a single HTTP packet is formed to convey the information representative of the stateless packet. However, as discussed herein, the information representative of the stateless packet can be distributed over multiple HTTP packets. The method 600 then flows to block 620.

At block 620, the packet is distributed for transmission over one or more of the MPTCP connections between the gateway and the CPE. Distributing the packet can include using multiple MPTCP connections to increase the bandwidth available to convey the packet, allocating a primary MPTCP connection to convey the packet and a secondary MPTCP connection as a backup connection in the event that the primary MPTCP connection fails, offloading portions of the traffic from a first MPTCP connection to a second MPTCP connection to perform load-balancing, and other traffic steering operations.

Figure 7:
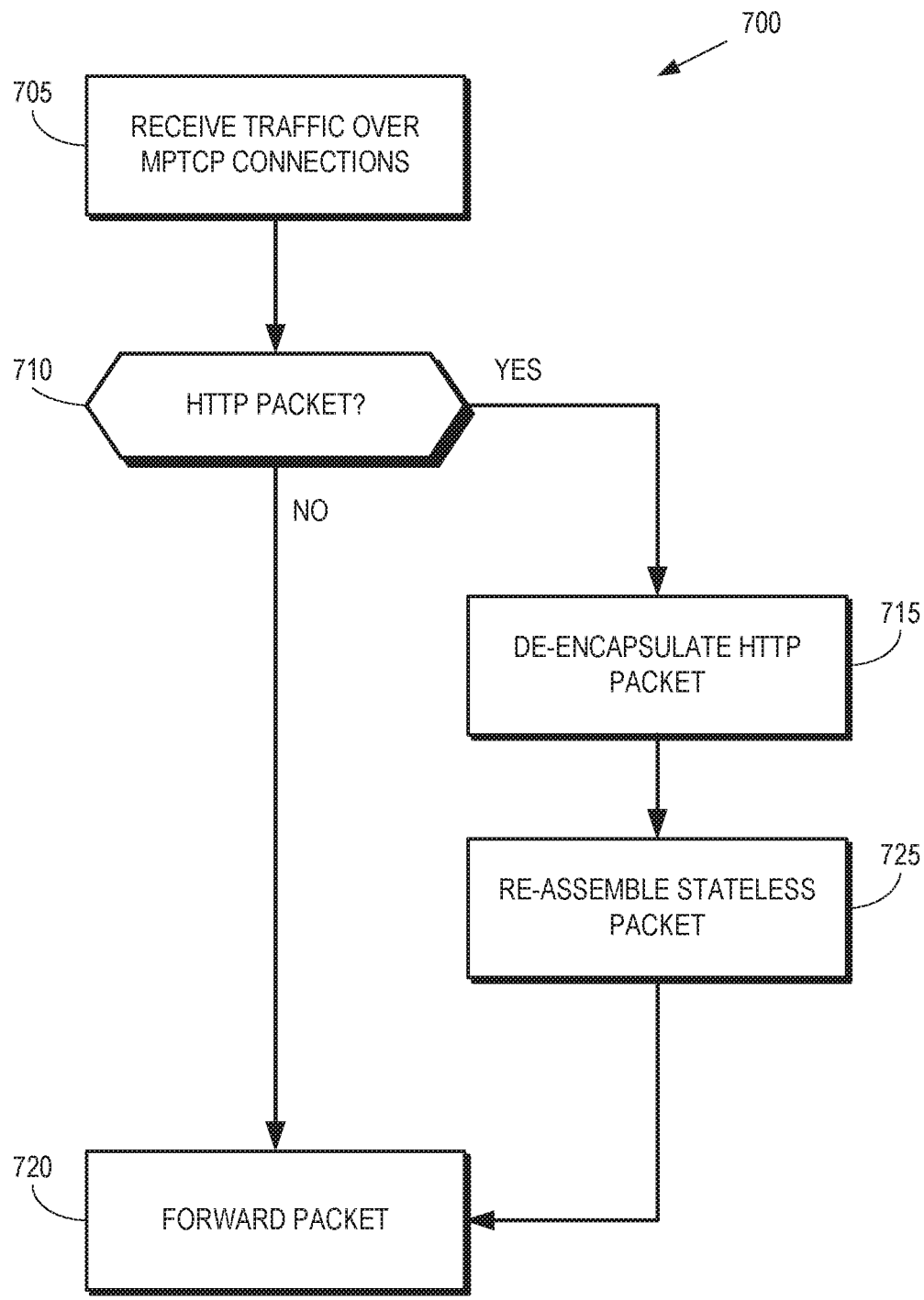
FIG. 7 is a flow diagram of a method of selectively de-encapsulating packets that include information representing stateless packets according to some embodiments.

FIG. 7 is a flow diagram of a method 700 of selectively de-encapsulating packets that include information representing stateless packets according to some embodiments. The method 700 is implemented in some embodiments of the hybrid access gateway 105 shown in FIG. 1, the CPE 110 shown in FIG. 1, and the receiver 300 shown in FIG. 3. In the illustrated embodiment, a gateway and a CPE are able to communicate over multiple networks such as wireline networks or wireless networks using an MPTCP session that supports multiple TCP subflows.

At block 705, traffic is received over one or more MPTCP connections. A gateway receives packets from a CPE over the MPTCP connections and the CPE receives packets from the gateway.

At block 710, the receiver determines whether the received packet is an HTTP packet. For example, a proxy and the receiver can inspect the received packet to determine whether it is an HTTP packet. If the received packet is an HTTP packet, the method 700 flows to block 715. If the received packet is not an HTTP packet, the method 700 flows to block 720.

At block 715, the HTTP packet is de-encapsulated. For example, an HTTP header is removed from the HTTP packet and information representative of a stateless packet is extracted from the payload of the HTTP packet. At block 725, the stateless packet is re-assembled from the information extracted from the payload of the HTTP packet. In some cases, the information extracted from the payload is combined with information extracted from payloads of other HTTP packets to re-assemble the stateless packet. The method 700 then flows to block 720.

At block 720, the packet is forwarded from the receiver. For example, the packet is forwarded to an entity in a network (such as a peer in a P2P communication) if the receiver is implemented in a gateway. For another example, the packet is forwarded to an application if the receiver is implemented in a CPE.

Figure 8:
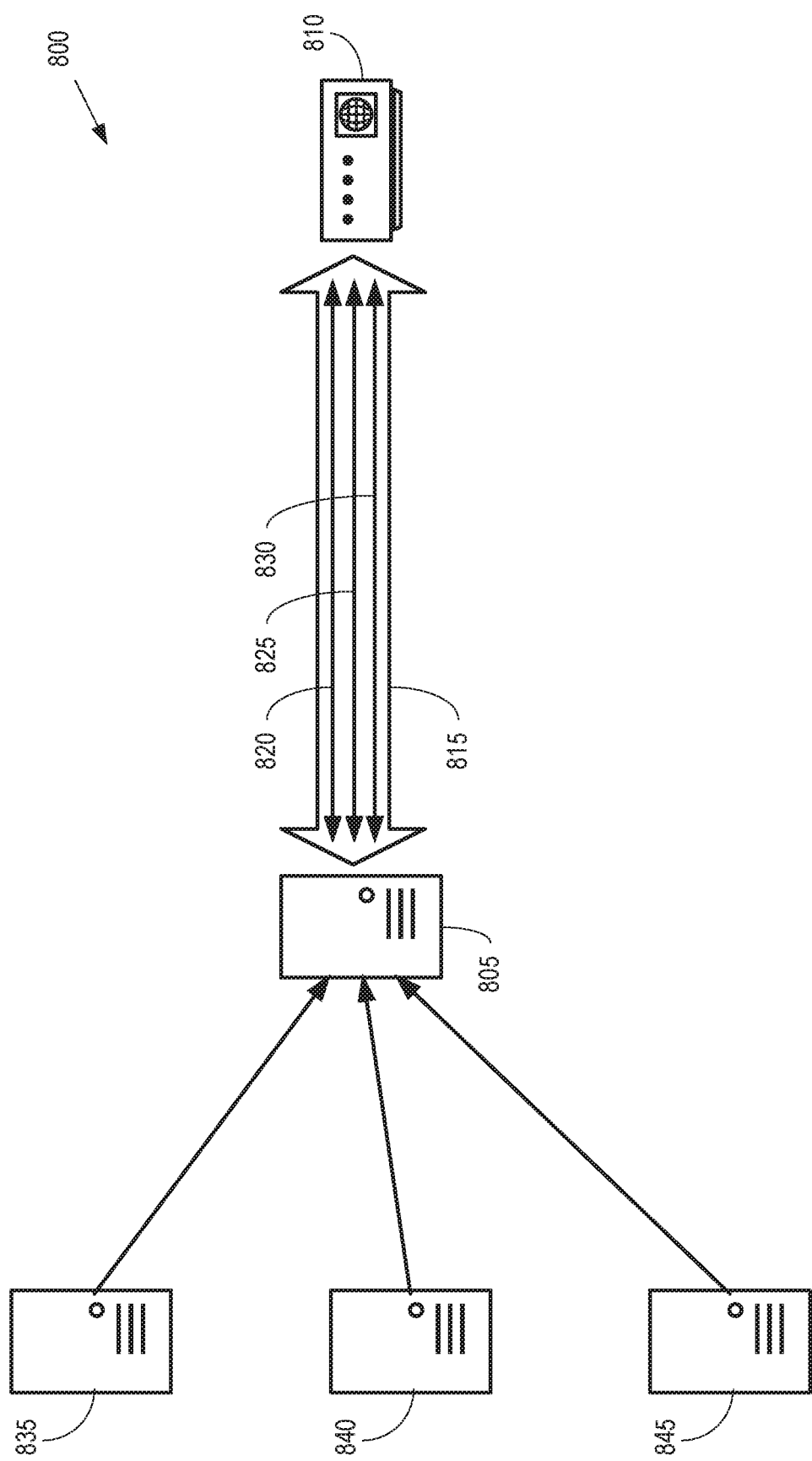
FIG. 8 is a diagram of a communication system according to some embodiments.

FIG. 8 is a diagram of a communication system 800 according to some embodiments. The communication system 800 includes a hybrid access gateway 805 and a CPE 810, which include proxies that operate according to MPTCP. In the illustrated embodiment, the hybrid access gateway 805 and the CPE 810 have established an MPTCP connection 815 that includes subflows 820, 825, 830 that are formed according to TCP to convey packets over one or more physical connections such as the wireline network 115 shown in FIG. 1 and the wireless network 120 shown in FIG. 1. The hybrid access gateway 805 and the CPE 810 are able to steer traffic associated with the subflows 820, 825, 830 to increase bandwidth, improve resiliency, perform load-balancing, and the like.

In the illustrated embodiment, the CPE 810 establishes multiple P2P connections with peers in servers 835, 840, 845. The P2P connections between the CPE 810 and each of the servers 835, 840, 845 are associated with corresponding subflows 820, 825, 830. For example, the P2P connection between the CPE 810 and the server 835 uses the subflow 820 to convey packets, the P2P connection between the CPE 810 and the server 840 uses the subflow 825 to convey packets, and the P2P connection between the CPE 810 and the server 845 uses the subflow 830 to convey packets. Thus, the single MPTCP connection 815 is able to support multiple subflows or connections, which allows the number of subflows or connections to scale to larger numbers such as the dozens or hundreds of servers that can be involved in a P2P connection.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    establishing a tunnel between a gateway and a customer premises equipment (CPE) that are connected by a plurality of concurrent communication paths, wherein the tunnel is associated with a hypertext transfer protocol (HTTP) session and supported by a multipath connection including a plurality of subflows associated with the plurality of concurrent communication paths;
    encapsulating a packet of a stateless flow based on the HTTP session to form an encapsulated packet; and
    transmitting the encapsulated packet over the multipath connection via at least one of the plurality of subflows.

2. The method of claim 1, wherein the stateless flow is a user datagram protocol (UDP) flow.

3. The method of claim 1, wherein the multipath connection is a multipath-transmission control protocol (MP-TCP) connection and the subflows are TCP connections.

4. The method of claim 1, further comprising:
    inspecting the packet to determine whether the packet is part of the stateless flow; and
    encapsulating the packet in response to determining that the packet is part of the stateless flow.

5. The method of claim 1, further comprising:
    generating a byte stream from the encapsulated packet;
    wherein transmitting the encapsulated packet comprises forwarding portions of the byte stream over the multipath connection.

6. The method of claim 5, wherein generating the byte stream comprises generating an extensible markup language (XML) header, a plurality of bytes that represent information in the packet of the stateless flow, and an XML terminator.

7. The method of claim 1, further comprising:
    receiving a plurality of packets in a corresponding plurality of stateless flows;
    encapsulating the plurality of packets; and
    transmitting the plurality of encapsulated packets over the multipath connection.

8. A method comprising:
    receiving an encapsulated packet via a tunnel between a gateway and a customer premises equipment (CPE) that are connected by a plurality of concurrent communication paths, wherein the tunnel is associated with a hypertext transfer protocol (HTTP) session and supported by a multipath connection including a plurality of subflows associated with the plurality of concurrent communication paths;
    de-encapsulating the encapsulated packet based on the HTTP session to form a de-encapsulated packet; and
    generating a packet of a stateless flow based on a payload of the de-encapsulated packet.

9. The method of claim 8, wherein the stateless flow is a user datagram protocol (UDP) flow.

10. The method of claim 8, wherein the multipath connection is a multipath-transmission control protocol (MP-TCP) connection and the subflows are TCP connections.

11. The method of claim 8, further comprising:
    inspecting the encapsulated packet to determine whether the encapsulated packet is associated with a the HTTP session; and
    de-encapsulating the encapsulated packet in response to determining that the encapsulated packet is associated with the HTTP session.

12. The method of claim 11, further comprising:
    receiving a plurality of encapsulated packets via the tunnel;
    de-encapsulating the plurality of encapsulated packets based on the HTTP session; and
    generating a plurality of packets of a plurality of stateless flows based on payloads of the plurality of de-encapsulated packets.

13. The method of claim 8, wherein receiving the encapsulated packet comprises receiving a byte stream over the multipath connection.

14. The method of claim 13, wherein receiving the byte stream comprises receiving an extensible markup language (XML) header, a plurality of bytes that represent information in the packet of the stateless flow, and an XML terminator.

15. An apparatus comprising:
    a proxy configured to establish a tunnel between a gateway and a customer premises equipment (CPE) that are connected by a plurality of concurrent communication paths, wherein the tunnel is associated with a hypertext transfer protocol (HTTP) session and supported by a multipath connection including a plurality of subflows associated with the plurality of concurrent communication paths;
    an encapsulation module configured to encapsulate a packet of a stateless flow based on the HTTP session to form an encapsulated packet; and
    a transmitter configured to transmit the encapsulated packet over the multipath connection via at least one of the plurality of subflows.

16. The apparatus of claim 15, wherein the stateless flow is a user datagram protocol (UDP) flow.

17. The apparatus of claim 15, wherein the multipath connection is a multipath-transmission control protocol (MP-TCP) connection and the subflows are TCP connections.

18. The apparatus of claim 15, further comprising:
a packet inspection module configured to inspect the packet to determine whether the packet is part of the stateless flow, and wherein the encapsulation module is configured to encapsulate the packet in response to the packet being part of the stateless flow.

19. The apparatus of claim 15, wherein the proxy is configured to generate a byte stream from the encapsulated packet and forward portions of the byte stream over the multipath connection.

20. The apparatus of claim 19, wherein the proxy is configured to generate a byte stream comprising an extensible markup language (XML) header, a plurality of bytes that represent information in the packet of the stateless flow, and an XML terminator.

21. The apparatus of claim 15, further comprising:
a receiver configured to receive a plurality of packets in a corresponding plurality of stateless flows;
wherein the encapsulation module is configured to encapsulate the plurality of packets based on an HTTP session; and
wherein the transmitter is configured to transmit the plurality of encapsulated packets over the multipath connection via at least one of the plurality of subflows.

22. An apparatus comprising:
a proxy configured to receive an encapsulated packet via a tunnel between a gateway and a customer premises equipment (CPE) that are connected by a plurality of concurrent communication paths, wherein the tunnel is associated with a hypertext transfer protocol (HTTP) session and supported by a multipath connection including a plurality of subflows associated with the plurality of concurrent communication paths;
a de-encapsulation module configured to de-encapsulate the encapsulated packet based on the HTTP session to form a de-encapsulated packet; and
a packet forwarding module configured to generate a packet of a stateless flow based on a payload of the de-encapsulated packet.

23. The apparatus of claim 22, wherein the stateless flow is a user datagram protocol (UDP) flow.

24. The apparatus of claim 22, wherein the multipath connection is a multipath-transmission control protocol (MP-TCP) connection and the subflows are TCP connections.

25. The apparatus of claim 22, wherein: the proxy is configured to inspect the encapsulated packet to determine whether the encapsulated packet is associated with the HTTP session, and the de-encapsulation module is configured to de-encapsulate the encapsulated packet in response to the encapsulated packet being associated with the HTTP session.

26. The apparatus of claim 25, wherein: the proxy is configured to receive information representing a plurality of encapsulated packets via the tunnel; the de-encapsulation module is configured to de-encapsulate the plurality of encapsulated packets based on the HTTP session; and the packet forwarding module is configured to generate a plurality of packets of a plurality of stateless flows based on payloads of the plurality of de-encapsulated packets.

27. The apparatus of claim 22, wherein the proxy is configured to receive a byte stream over the paths multipath connection.

28. The apparatus of claim 27, wherein the proxy is configured to receive a byte stream comprising an extensible markup language (XML) header, a plurality of bytes that represent information in the packet of the stateless flow, and an XML terminator.

* * * * *